Figure 1:
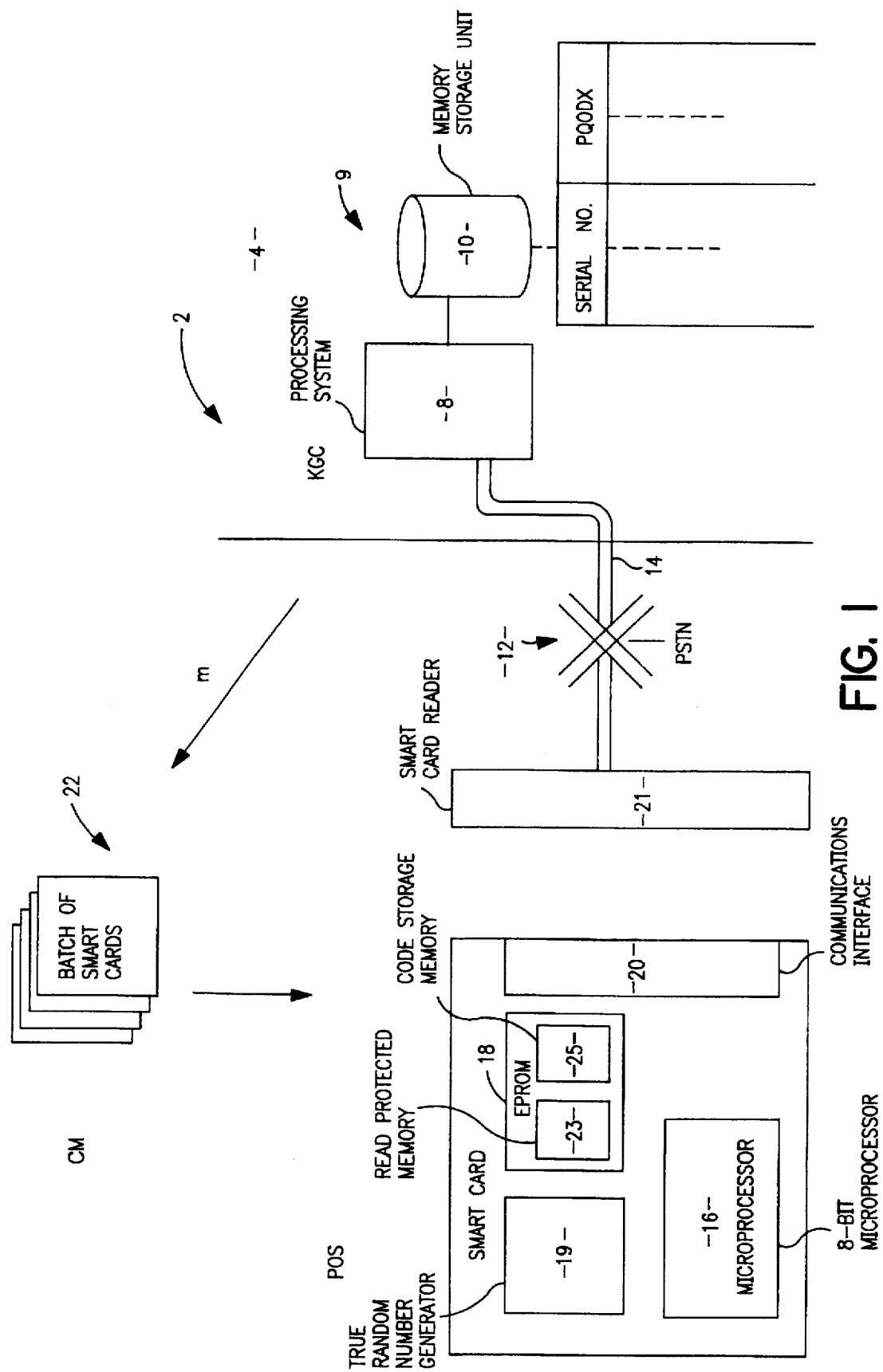

United States Patent [19]

Zuk

[11] Patent Number: 5,745,571
[45] Date of Patent: Apr. 28, 1998

[54] CRYPTOGRAPHIC COMMUNICATIONS METHOD AND SYSTEM

[75] Inventor: Edward Andrew Zuk, Elwood, Australia

[73] Assignee: Telstra Corporation Limited, Melbourne, Australia

[21] Appl. No.: 313,214

[22] PCT Filed: Mar. 30, 1993

[86] PCT No.: PCT/AU93/00137

§ 371 Date: Nov. 14, 1994

§ 102(e) Date: Nov. 14, 1994

[87] PCT Pub. No.: WO93/20538

PCT Pub. Date: Oct. 14, 1993

[30] Foreign Application Priority Data

Mar. 30, 1992 [AU] Australia .................. PL1602

[51] Int. Cl.$^6$ ............... H04L 9/08; H04L 9/30; H04L 9/00
[52] U.S. Cl. ............ 380/21; 380/4; 380/9; 380/23; 380/25; 380/30; 380/48; 380/49; 235/380
[58] Field of Search ............... 380/4, 9, 21, 23, 380/30, 46, 48, 49, 50, 24, 25; 235/379, 380

[56] References Cited

U.S. PATENT DOCUMENTS

| | | | |
|---|---|---|---|
| 4,211,919 | 7/1980 | Ugon | 380/23 X |
| 4,672,182 | 6/1987 | Hirokawa | 380/23 X |
| 4,823,182 | 4/1989 | Mizutani et al. | 380/23 |
| 5,068,894 | 11/1991 | Hoppe | 380/23 |
| 5,202,922 | 4/1993 | Iijima | 380/23 X |
| 5,218,637 | 6/1993 | Angebaud et al. | 380/23 |
| 5,218,638 | 6/1993 | Matsumoto et al. | 380/23 |
| 5,311,595 | 5/1994 | Bjerrum et al. | 380/23 X |

*Primary Examiner*—Bernarr E. Gregory
*Attorney, Agent, or Firm*—Blakely Sokoloff Taylor & Zafman

[57] ABSTRACT

A method for loading secret data, such as an application key, on a smart card (6), which involves storing a random key on the card (6), encrypting the random key on the basis of a public key, and providing the encrypted random key to a central processing station (4). The encrypted random key is decrypted at the central station on the basis of a secret key, and the station (4) encrypts data on the basis of the random key and transmits it to the smart card (6). The smart card decrypts the encrypted data on the basis of the random key. The random key can be generated internally and stored on read protected memory (23) of the card (6). The public key encrypting and secret key decrypting steps may be based on the RSA algorithm, using a small encryption exponent.

39 Claims, 1 Drawing Sheet

CRYPTOGRAPHIC COMMUNICATIONS METHOD AND SYSTEM

The present invention relates to a cryptographic method and system and, in particular to a smart card and method of initialising a smart card.

Cryptographic techniques are used to encrypt and decrypt sensitive communications between two terminals. A particular problem exists in ensuring secure communications between credit cards and a central processing station, or host, and the problem becomes more acute with respect to smart cards which are intended to transmit and receive sensitive data. Conventional encryption techniques require that the smart card have a secret key before any sensitive data can be loaded onto the card. Present solutions for smart cards are usually based around one of two techniques. The first involves loading the card with secret information through a physically secure communications channel, which unfortunately is not always practical. The second technique involves relying on the card manufacturer to place an initial secret key on the card, and the card owner then uses the secret key to load the sensitive data required for card applications. Unfortunately, the card manufacturer then has at its disposal all of the information necessary to decipher communications with the card and to recover any secret information loaded on the card.

European patent publication 138,386 describes a system for smart card communication with a host where the encryption and decryption keys are generated internally by the card and the host on the basis of a random number generated by the host and a pre-assigned code number PN allocated to the card. The system, however, again suffers from the disadvantage that the pre-assigned code number needs to be stored in the card on manufacture or else it must be placed on the card in a physically secure environment. If the pre-assigned code number PN cannot be transferred in a physically secure environment, then there is a risk it may become known to someone other than an authorised user. The card could then be used in an unauthorised manner by simply providing an appropriate random number to the card, once the PN and logic used to generated the encryption key are known. It is therefore advantageous to provide a system which could be used for smart cards, and which does not require any third party to be provided with information from which an encryption key can be simply derived or a secure environment within which a pre-assigned code number must be transferred.

Most encryption techniques use a key which is generally a large number on which the encryption and decryption processes are based. Public key encryption techniques, where the transmitting terminal employs a public key to encrypt the transmitted data, and the receiving terminal uses a secret key to decrypt the data, have been found to be particularly advantageous. Data can be readily encrypted without requiring a secret key, yet encrypted communications cannot be intercepted and then decrypted without knowledge of the secret key. The secret key needs to be such that it is related to the public key but cannot be efficiently derived from the public key. An encryption method which uses such a public key and secret key technique is known as the RSA method, and is described in U.S. Pat. No. 4,405,829. According to the RSA method, a message M is encrypted into ciphertext C using the following:

$$C = M^e \pmod{n}$$

where $n = p.q$, $p$ and $q$ are prime numbers and $e$ is a number relatively prime to $(p-1)(q-1)$. The message, or plaintext, is reconstructed from the transmitted ciphertext using the following:

$$M = C^d \pmod{n}$$

where d is determined from p,q and e by the following relationship:

$$e.d \equiv 1 \pmod{(1 \text{ cm } (p-1),(q-1))}$$

1 cm being the acronym for least common multiple. The exponent c and the modulus n are used as the public key and the primes p and q and exponent d are kept secret and constitute the secret key. Provided n is made sufficiently large, such as 512 bits, the primes cannot be efficiently determined from n. The RSA method, however, is computationally intensive and is primarily suitable for powerful processing systems.

Public key techniques or algorithms, being computationally intensive have been considered too slow to execute and requiring too much memory in order to be practical for use on smart cards without additional specialised hardware. Most smart cards have very limited memory for both data and program storage, and employ microprocessors, such as 8 bit microprocessor, which are very slow compared with more powerful processors employed in personal computers and computer workstations. Many smart card applications require all of the program memory available on the card, and as much memory as possible for data, which renders permanent hardware and software implementations of public key algorithms impractical.

The present invention provides a cryptographic communications method comprising:

storing a random key on a smart card;

encrypting said random key on the basis of a public key and providing the encrypted random key to a central processing station;

decrypting said encrypted random key at said central station on the basis of a secret key;

encrypting data on the basis of said random key and transmitting the encrypted data from said central station to said smart card; and decrypting the encrypted data at said smart card on the basis of said random key.

The present invention also provides a communications system comprising smart card means and a central processing station, said smart card means including:

means for storing a random key on a smart card, means for encrypting said random key on the basis of a public key, and means for decrypting data encrypted on the basis of said random key; and said central station including:

means for decrypting the encrypted random key on the basis of a secret key, and means for encrypting data on the basis of said random key and transmitting the encrypted data to said smart card.

The present invention further provides a method of initialising a smart card comprising:

generating a random key;

storing said random key in a memory area of said smart card which is not externally addressable;

encrypting said random key on the basis of a public key;

providing a central processing station with the encrypted random key;

decrypting said encrypted random key at said central station on the basis of a secret key;

encrypting secret data at said central station on the basis of said random key;

transmitting the encrypted secret data to said smart card; and decrypting said encrypted secret data at said smart card on the basis of said random key.

The present invention also provides a smart card comprising:

read protected memory for storing a random key and a public key;

means for encrypting said random key on the basis of said public key; and means for decrypting encrypted data on the basis of said random key.

A preferred embodiment of the present invention is hereinafter described with reference to the accompanying drawing, wherein:

FIG. 1 is a block diagram of a preferred communication system according to the present invention.

A communications system 2, as shown in FIG. 1, includes a key generation centre 4 and a smart card 6. The key generation centre (KGC) 4 is a central host station and includes a processing system 8 connected to a memory storage unit 10. The KGC may be implemented by a personal computer 9. The processing unit 8 is adapted to be connected to the smart card 6 by a public switched telecommunications network (PSTN) 12 on a telecommunications line 14. The KGC 4 stores in the unit 10 information on all of the smart cards 6 which can be connected to the processing system 8, and the information is stored with reference to the serial numbers of the cards 6. The smart cards 6 each include an 8 bit microprocessor 16, EEPROM memory 18, a true random number generator 19, and a communications interface 20 for connection to the line 14 or to an intermediary terminal, such as a smart card reader 21, connected to the line 14 and which is able to communicate with the computer 9 of the KGC 4. The EEPROM 18 includes an area 23 of read protected memory and another area 25 for the storage of code to be executed from the EEPROM 18. The area 25 is also preferably read protected. The read protected area 23 cannot be addressed by an external device. The card 6 also includes a respective serial number stored therein. The card reader 21 may be part of a point-of-sale (POS) terminal. The card 6 and the KGC 4 may be associated with a banking system or a mobile telecommunications system wherein mobile telecommunications terminals are provided which can only be used when a smart card 6 with appropriate authenticating data is inserted in a terminal.

The computer 9 of the KGC 4 and the smart card 6 include software to compute a Mont_power function defined as follows:

$$\text{Mont\_power}(a,b,m) = a^{b}*(2^{-R})^{(b-1)}(\text{mod } m)$$

where in the preferred implementation R=512. The exponent b for encryption on the smart card 6 is selected to be small and equal to 3. The Mont_power function is a variation of the RSA algorithm which improves the performance and program size of the RSA algorithm by using the Montgomery modulo reduction method discussed in P. L. Montgomery, "Modular Multiplication without Trial Division", Mathematics of Computation, Vol. 44, No. 170, pp 519–521, April 1985, herein incorporated by reference. The article discusses an efficient algorithm for executing the Mont_power function. The modulo reduction step can be incorporated in a multi-precision multiplication loop to calculate the Mont_power function. The modulo reduction step involves setting least significant bits to zero and shifting the resultant bits at each multiplication step. This is particularly advantageous as it removes the need to perform computationally intensive long division.

The computer 9 also includes software to generate the large composite number, m, which is difficult to factorise $2^{511}<m<2^{512}$, from the product of two primes, p and q, each of which produces a remainder of 2 when divided by 3, i.e. p mod 3≡2, and q mod 3≡2, and are such that (p−1)(q−1) is not divisible by 3.

The EEPROM 18 of the smart card 6 is loaded with executable program code to extend the standard application and communications functions of the card 6 to include the following routines:

1. A C1 routine to generate a 512 bit random number, r, using the random number generator 19, such that $2^{511}<r\leq m$, and store r in the read protected part 23 of the EEPROM 18.

2. A C2 routine to calculate and output on the communications interface 20 x=Mont_power (r,3,m), which is r encrypted by the Mont_power function using an exponent of 3.

3. A C3 routine which inputs 512 bits of data and exclusive-ORs the data with r, and stores the result in the read protected area 23. The routine then deletes m, r and routines C1, C2 and C3.

To establish the communications system 2, the KGC 4 generates the two primes, p and q, as discussed previously, such that factorisation of the product of p and q is infeasible. The primes are generated for each card 6, or for a batch 22 of cards 6 which would make the manufacturing process simpler. The KGC 4 is then able to calculate m=p·q, $\phi$=(p−1)(q−1) and the decryption key d, where 3d≡1 mod $\phi$. Plaintext z encrypted using Mont_power (z,3,m) can then be decrypted using the Mont_power function as follows:

$$\begin{aligned}\text{Mont\_power}(\text{Mont\_power}(z,3,m),d,m) &\equiv ((z^3)*(2^{-R})^2)^d * \\ &\quad (2^{-R})^{(d-1)}\text{mod}(m) \\ &\equiv z^{3d} * (2^{-R})^{2d} * \\ &\quad (2^{-R})^{(d-1)}\text{mod}(m) \\ &\equiv z^{3d} * (2^{-R})^{3d-1}\text{mod}(m) \\ &\equiv z \text{ mod}(m)\end{aligned}$$

as $Z^{3d} \equiv Z$ mod m for any integer Z, $0 \leq Z < m$.

The RSA encryption algorithm normally utilises large exponents, and the use of a small exponent of 3 is particularly advantageous as it enables the smart card 6 to execute the public encryption function of RSA, using the Mont_power function, in a reasonable amount of time with small program size and memory usage, notwithstanding the limited power of the processor 16.

The KGC 4 provides the serial numbers and the products m to a card manufacturer (CM) who makes a batch 22 of cards 6. The product m is given confidentially to the card manufacturer as it can be used as a basis for determining the authenticity or validity of the card 6 during subsequent communications with the KGC 4 at a POS outlet, as discussed hereinafter. The primes p and q, $\phi$ and the secret key d are all kept secret and are stored in the storage unit 10 of the KGC 4 against a serial number of a card 6.

The card manufacturer stores m in the read protected part 23 of the EEPROM 18, and stores the program code, including the routines C1, C2 and C3, in the area 25. Execution of the program code may be protected by a requirement that a personal serial number (PIN) be provided for execution to occur.

Following manufacture, the CM distributes the cards to the point of sale (POS) outlets where a card 6 can be sold to a customer. On having sold a card 6 to a customer, it is connected to a point of sale terminal 21 and the card 6 operates to execute the C1 routine and generate internally a random number r. The card 6 then executes the C2 public key encryption routine and outputs x and the serial number to the KGC 4 on the line 14. The random number r and the serial number are stored at the KGC 4 after decrypting x using r=Mont_power (x,d,m). The KGC 4 then produces an application, master or authentication key $K_i$ as a random value for the card and this is transmitted with any other sensitive and secret information, such as a GSM subscriber identifier number for a GSM digital telecommunications network, to the card 6. The application key $K_i$ and the other sensitive information are encrypted for transmission to the card 6 on the basis of the random number r. The encryption technique is simply exclusive-ORing r with $K_i$ and the other sensitive data to obtain ciphertext X. The card 6 is able to decrypt X to obtain the application key and the other data on the basis of the key r stored therein which is simply exclusive-ORed with X using the C3 routine. Once the application key and the other data have been stored on the card 6 and the routine C3 completed the card can be allowed to leave the point of sale. The application key is used in applications which are loaded on the smart card 6, and can be used as a basis for generation of session keys for subsequent communications.

The routines C1, C2 and C3 and m and r are erased by the routine C3 after the authentication key and the other data has been stored on the card 6 so as to advantageously allow the card 6 to use the memory space previously occupied by the routines and m and r. Therefore the card 6 which receives the initial secret data only needs to perform the public encryption part of the RSA algorithm and the memory used to execute this part is recovered after the secret data is received. Public key cryptosystems are not conventionally used in this manner.

The above method of sending the sensitive data from the KGC 4 to the card 6 is also particularly advantageous as the modulus m can be given to the card manufacturer for placement on the card without the manufacturer gaining any additional information which would assist in recovering any secret data to be passed to the card 6. The encryption key r is generated and stored internally within the card without requiring the key r to be divulged to any third party, such as the card manufacturer, the personnel at the point of sale outlet or the customer. As r is internally generated and stored it can only be obtained by destroying the integrity of the card 6.

Alternatively, the card manufacturer can be asked to execute the routines C1 and C2 once the card has been manufactured so as to store the key r in the cards prior to dispatch to POS outlets. The cipher value x produced by the routine C2 is sent to the KGC 4 with the corresponding serial number of each card 6. The serial numbers and corresponding x values of the cards 6 are placed in a secure file which is protected from modifications and passed to the KGC 4 for storage therein. The cards 6 are then distributed, and on connecting the card 6 to a card reader 21 at a POS terminal, the card 6 sends its serial number to the KGC 4. The KGC 4 accesses the corresponding x value on the basis of the serial number, and decrypts the x value to obtain r using r=Mont_power (x,d,m). Secret information can then be sent to the card 6 by exclusive-ORing the secret data with r, and then receiving and decrypting the secret data using the card routine C3, as discussed previously. Information generated internally by the card 6, such as the value x, can be used to authenticate the card instead of the modulus m. The CM and POS outlets are still not able to obtain the random key r without destroying the integrity of the card 6.

When the CM executes the routine C1 and C2, they may, instead of being executed on the card, be executed on a device connected to the card which has a secure communications environment with the card 6. This, of course, does significantly reduce the security of the system as the random number r is not generated on the card 6.

I claim:

1. A cryptographic communications method comprising:
   storing a random key on a smart card;
   encrypting said random key using a public key and providing the encrypted random key to a central processing station;
   decrypting said encrypted random key at said central station using a secret key;
   encrypting data using said random key and transmitting the encrypted data from said central station to said smart card; and
   decrypting the encrypted data at said smart card using said random key.

2. A communications method as claimed in claim 1, wherein said random key is stored in a memory area of said smart card which is not externally addressable.

3. A communications method as claimed in claim 2, wherein said data includes an application key for said card.

4. A communications method as claimed in claim 3, including generating said random key on said smart card.

5. A communications method as claimed in claim 4, including deleting at least one of said random key, said public key, and a program code for encrypting using said public key, after receiving said data.

6. A communications method as claimed in claim 5, including storing an identification number on said smart card, transmitting said identification number to said central station, and accessing said secret key at said central station using said identification number.

7. A communications method as claimed in claim 6, including generating said public and secret keys at said station and storing said secret key using said identification number.

8. A communications method as claimed in claim 7, wherein said public and secret keys are unique for said smart card.

9. A communications method as claimed in claim 7, wherein said public and secret keys are unique for a batch of smart cards.

10. A communications method as claimed in claim 7, wherein the pubic key encrypting and secret key decrypting steps comprise an RSA based algorithm, using a modulus m and a small encryption exponent.

11. A communications method as claimed in claim 10, wherein said exponent is three.

12. A communications method as claimed in claim 10, including keeping said modulus secret and using said modulus to authenticate said smart card.

13. A communications method as claimed in claim 10, including using said encrypted random key to authenticate said smart card.

14. A communications method as claimed in claim 10, wherein said algorithm comprises encrypting and decrypting a value Z using:

$$Z^{b*(2^{-R})(b-1)}(\text{mod } m)$$

where b is the exponent and R is a constant.

15. A communications system comprising smart card means and a central processing station, said smart card means including:

means for storing a random key on a smart card, means for encrypting said random key using a public key; and means for decrypting data encrypted using said random key; and said central station including:

means for decrypting the encrypted random key using a secret key, and means for encrypting data using said random key and transmitting the encrypted data to said smart card.

16. A communications system as claimed in claim 15, wherein said storing means is not externally addressable.

17. A communications system as claimed in claim 16, wherein said data includes an application key for said card.

18. A communications system as claimed in claim 17, wherein said smart card means includes means for generating said random key on said smart card.

19. A communications system as claimed in claim 18, wherein said smart card includes program code for encrypting using said public key, wherein at least one of said program code, said public key and said random key are deleted after said smart card receives said data.

20. A communications system as claimed in claim 19, wherein said smart card includes an identification number, and means for transmitting said identification number to said central station, said central station including means for accessing said secret key using said identification number.

21. A communications system as claimed in claim 20, wherein said central station includes means for generating said public and secret keys and storing said secret key using said identification number.

22. A communications system as claimed in claim 21, wherein said public and secret keys are unique for said smart card.

23. A communications system as claimed in claim 21, wherein said public and secret keys are unique for a batch of smart cards.

24. A communications system as claimed in claim 21, wherein said public key encrypting means and said secret key decrypting means execute an RSA based algorithm, using a modulus m and a small encryption exponent.

25. A communications system as claimed in claim 24, wherein said exponent is three.

26. A communications system as claimed in claim 24, wherein said modulus is kept secret and used to authenticate said smart card.

27. A communications system as claimed in claim 24, wherein said encrypted random key is used to authenticate said smart card.

28. A communications system as claimed in claim 24, wherein said algorithm comprises encrypting and decrypting a value Z using:

$$Z^b * (2^{-R})^{(b-1)} (\bmod m)$$

where b is the exponent and R is a constant.

29. A method of initializing a smart card comprising:

generating a random key;

storing said random key in a memory area of said smart card which is not externally addressable;

encrypting said random key using a public key;

providing a central processing station with the encrypted random key;

decrypting said encrypted random key at said central station using a secret key;

encrypting secret data at said central station using said random key;

transmitting the encrypted secret data to said smart card; and decrypting said encrypted secret data at said smart card using said random key.

30. A method as claimed in claim 29, wherein said secret data includes an application key for said smart card.

31. A method as claimed in claim 30, wherein said random key is generated on said card.

32. A method as claimed in claim 30, including deleting at least one of said random key, said public key and a program code for encrypting using said public key from said smart card after receiving said secret data.

33. A method as claimed in claim 30, including generating said public and secret keys for said smart card at said central station.

34. A method as claimed in claim 30, wherein said public key encrypting and secret key decrypting steps comprise a Montgomery modulo reduced RSA based algorithm, using a modulus m and a small encryption exponent.

35. A smart card comprising:

read protected memory for storing a random key and a public key;

means for encrypting said random key using said public key; and means for decrypting encrypted data using said random key.

36. A smart card as claimed in claim 35, wherein said data includes an application key.

37. A smart card as claimed in claim 35, including means for generating said random key.

38. A smart card as claimed in claim 35, including means for deleting at least one of said random key and said public key and a program code for encrypting using said public key after receiving said data.

39. A smart card as claimed in claim 35, wherein said means for encrypting executes a public key component of a Montgomery modulo reduced RSA based algorithm, using a modulus m and a small encryption exponent.

* * * * *